Jan. 9, 1945.                    W. J. CARTLEDGE                    2,366,831
                                WOODWORKING MACHINE
                              Filed April 16, 1942                6 Sheets-Sheet 5
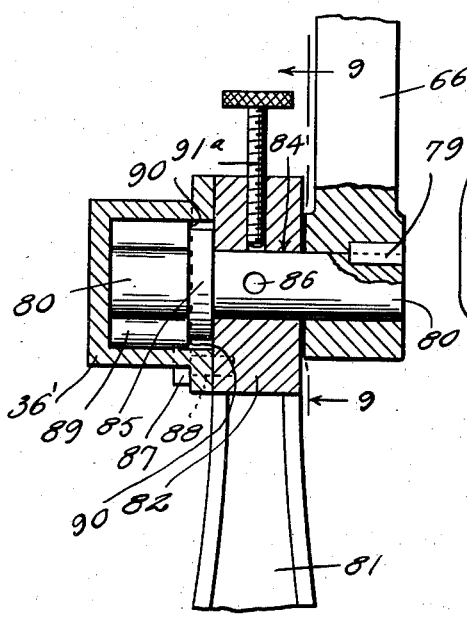
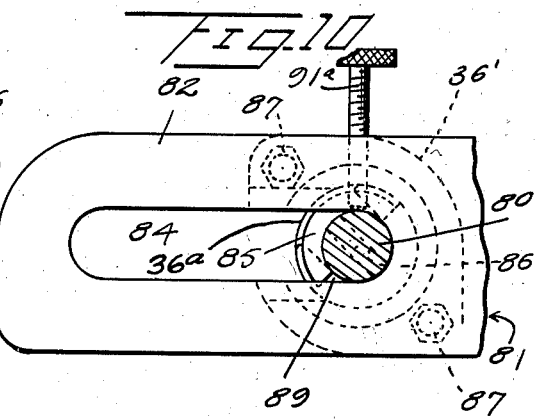
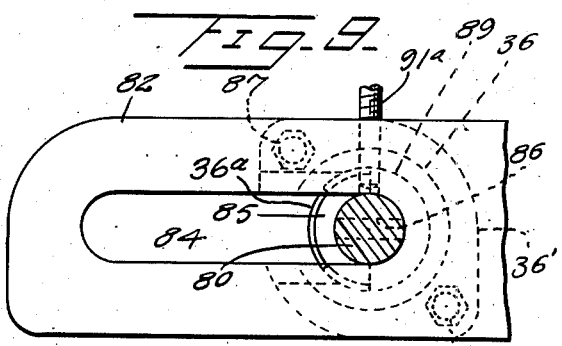
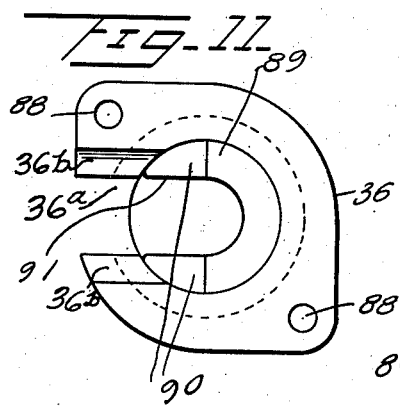
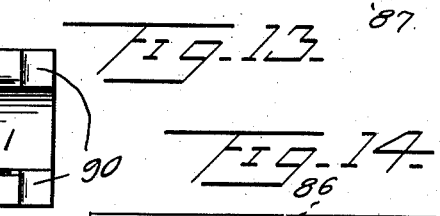
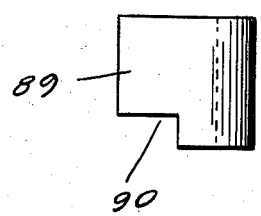
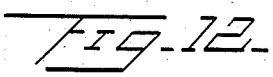
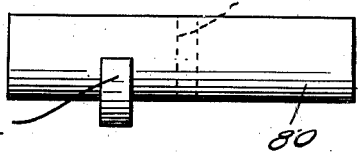
Inventor
W. J. Cartledge
By L. T. Randolph
Attorney Jan. 9, 1945.  W. J. CARTLEDGE  2,366,831
WOODWORKING MACHINE
Filed April 16, 1942   6 Sheets-Sheet 6
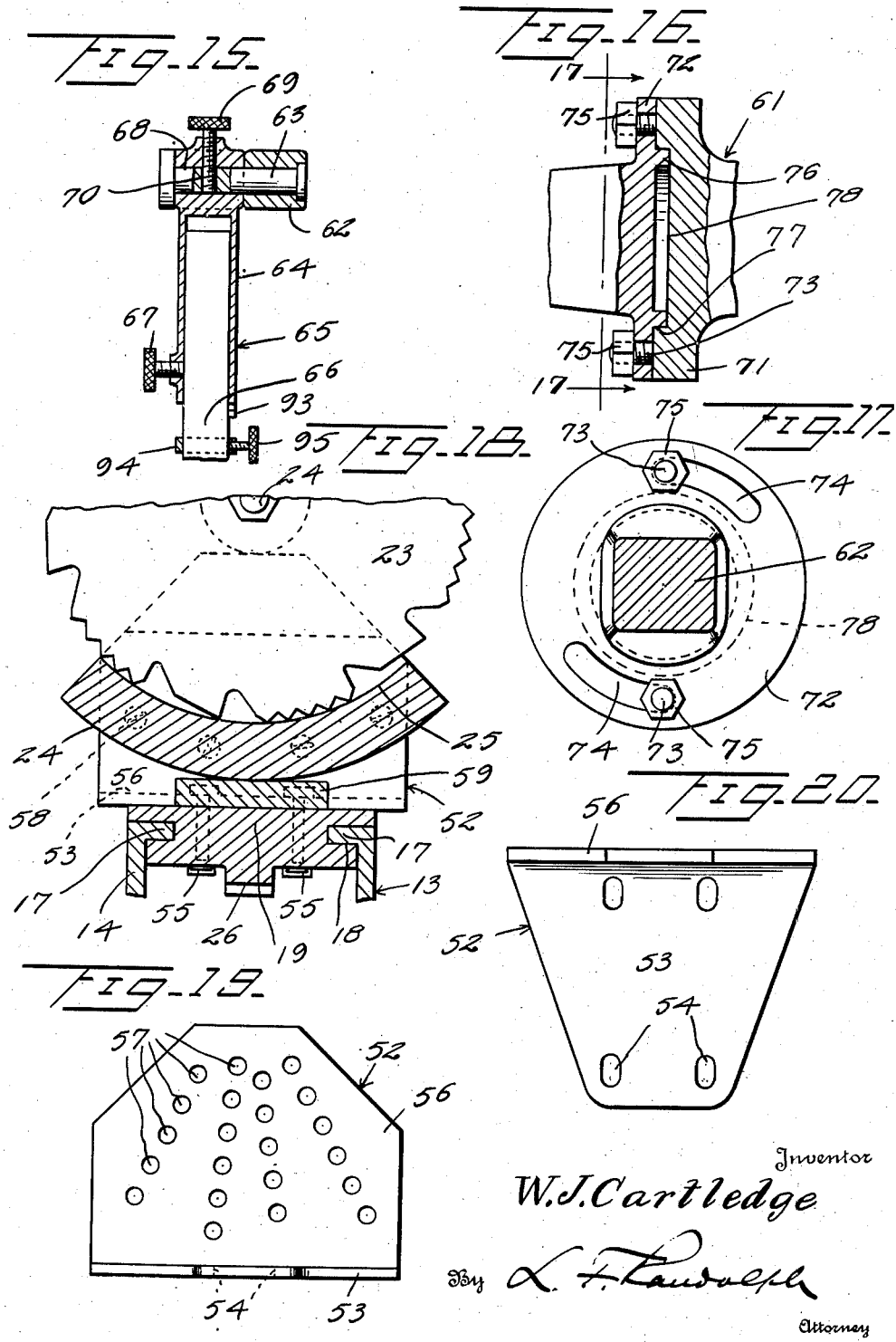
Inventor
W. J. Cartledge
By L. F. Randolph
Attorney Patented Jan. 9, 1945

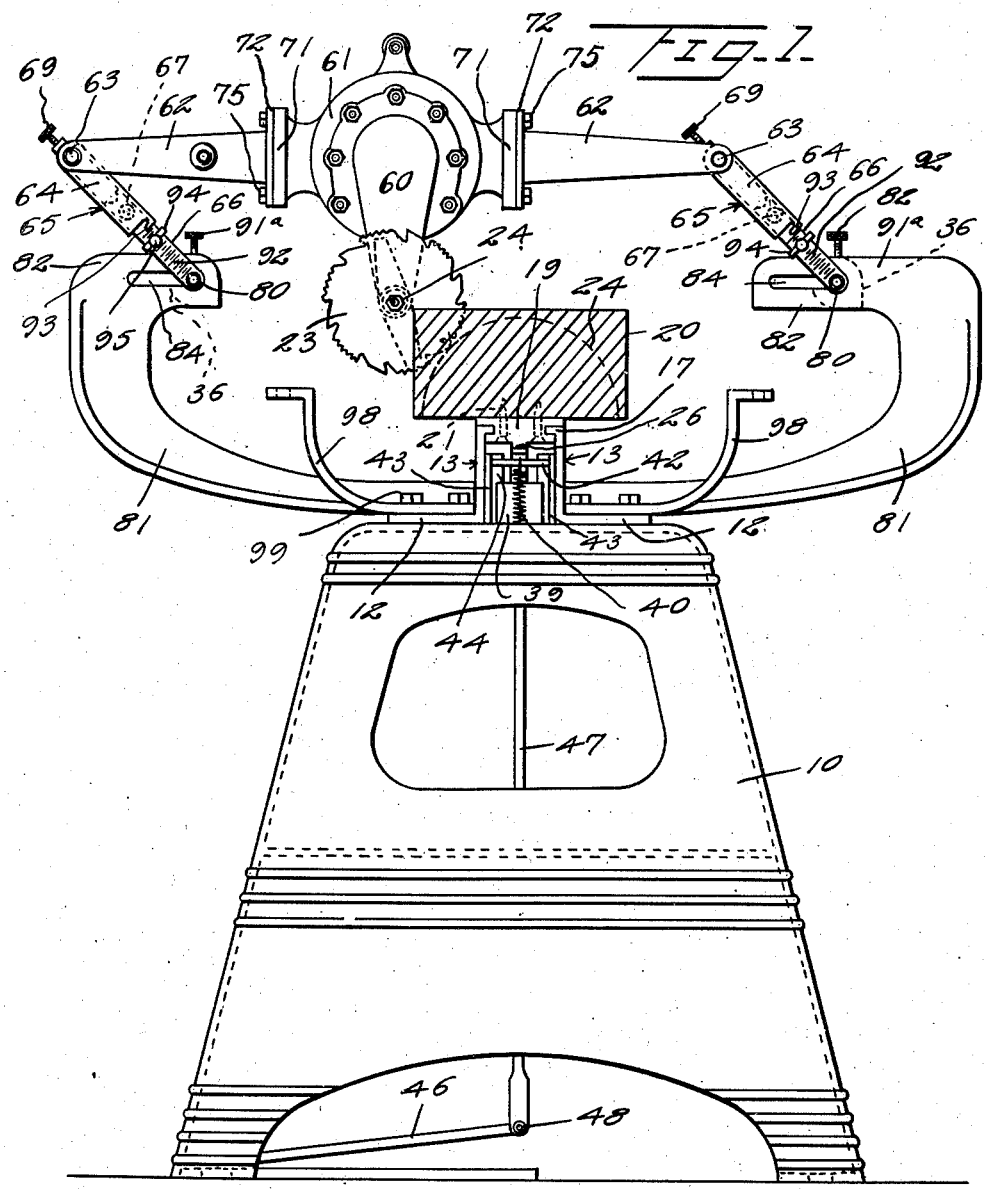

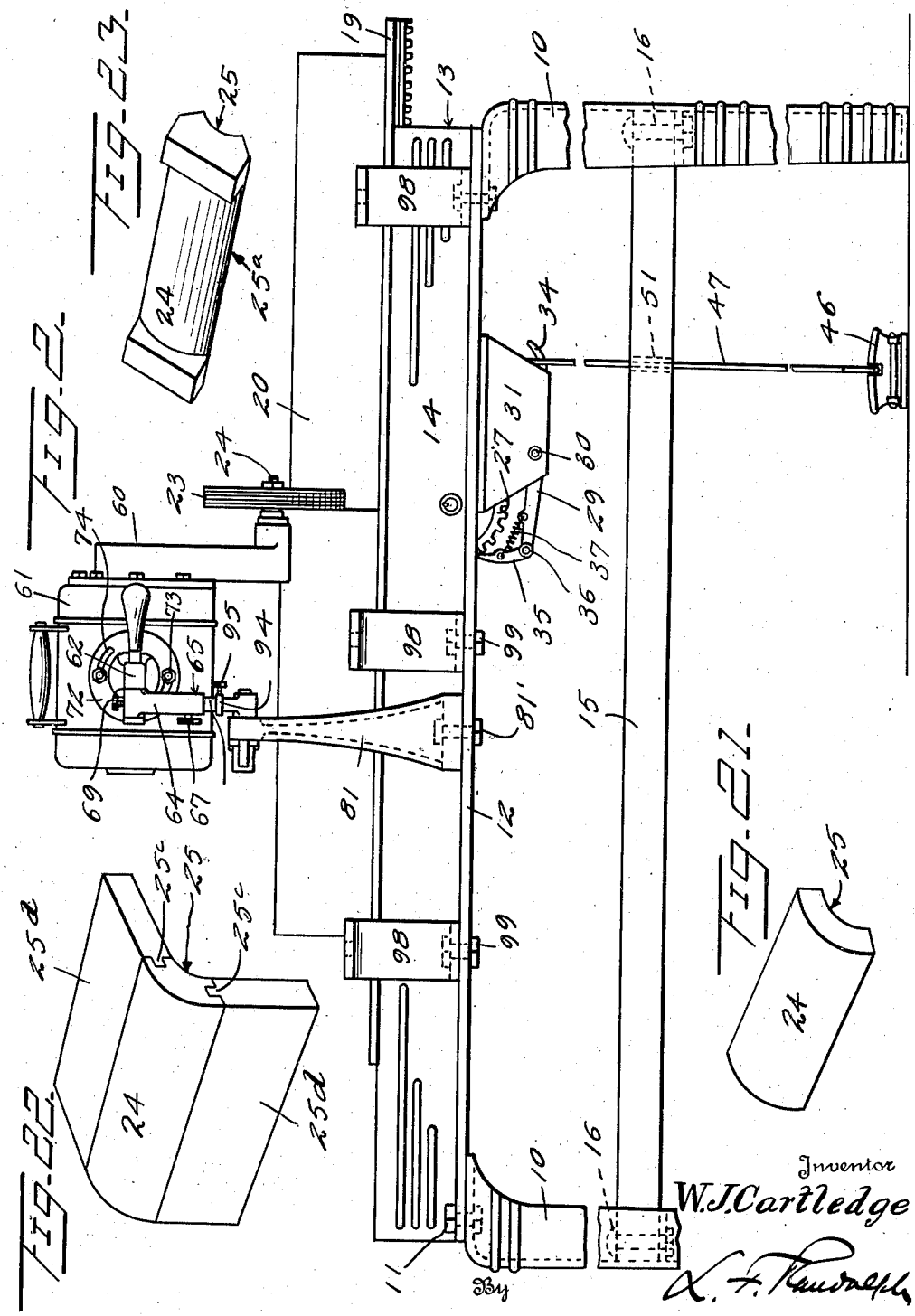

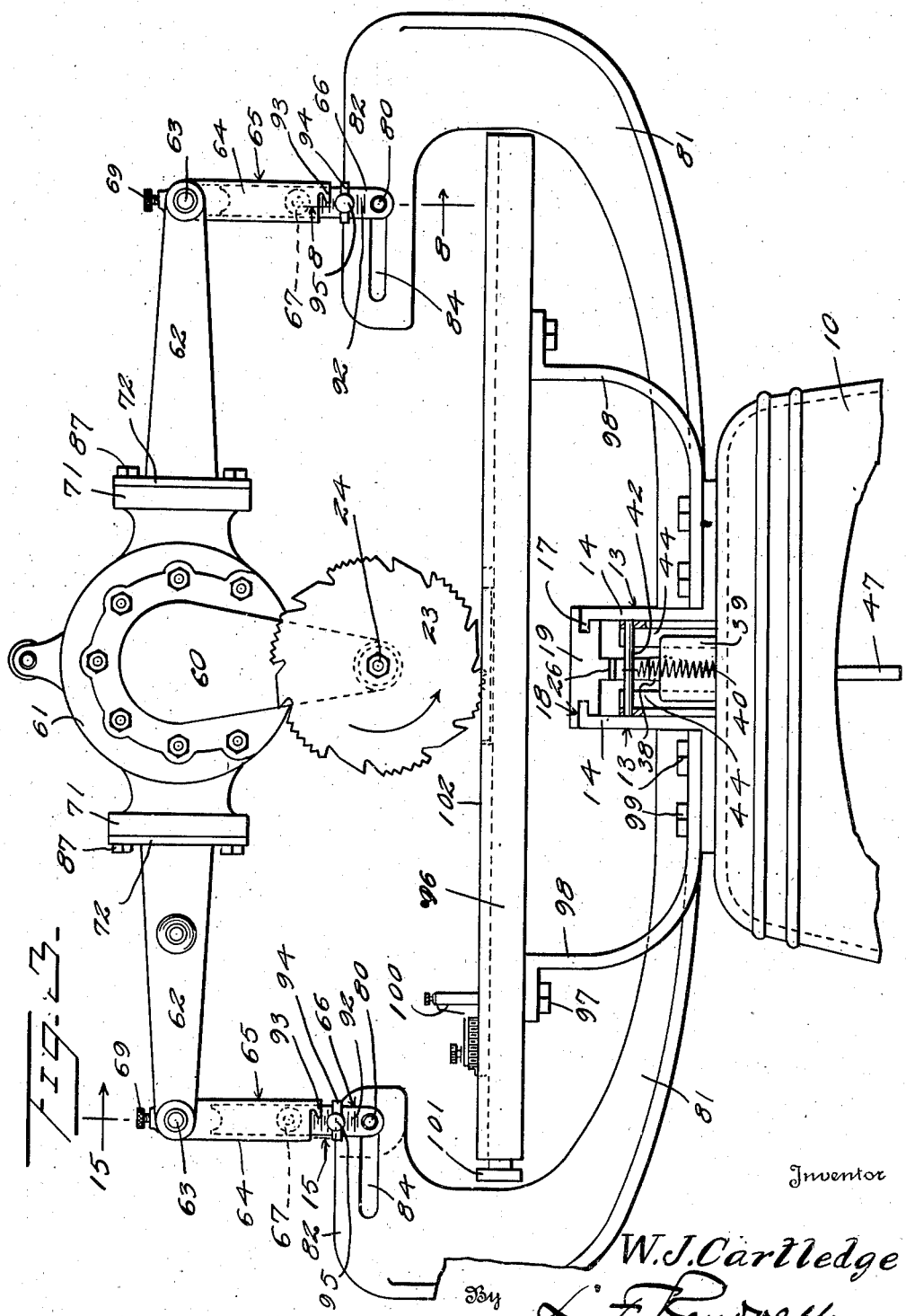

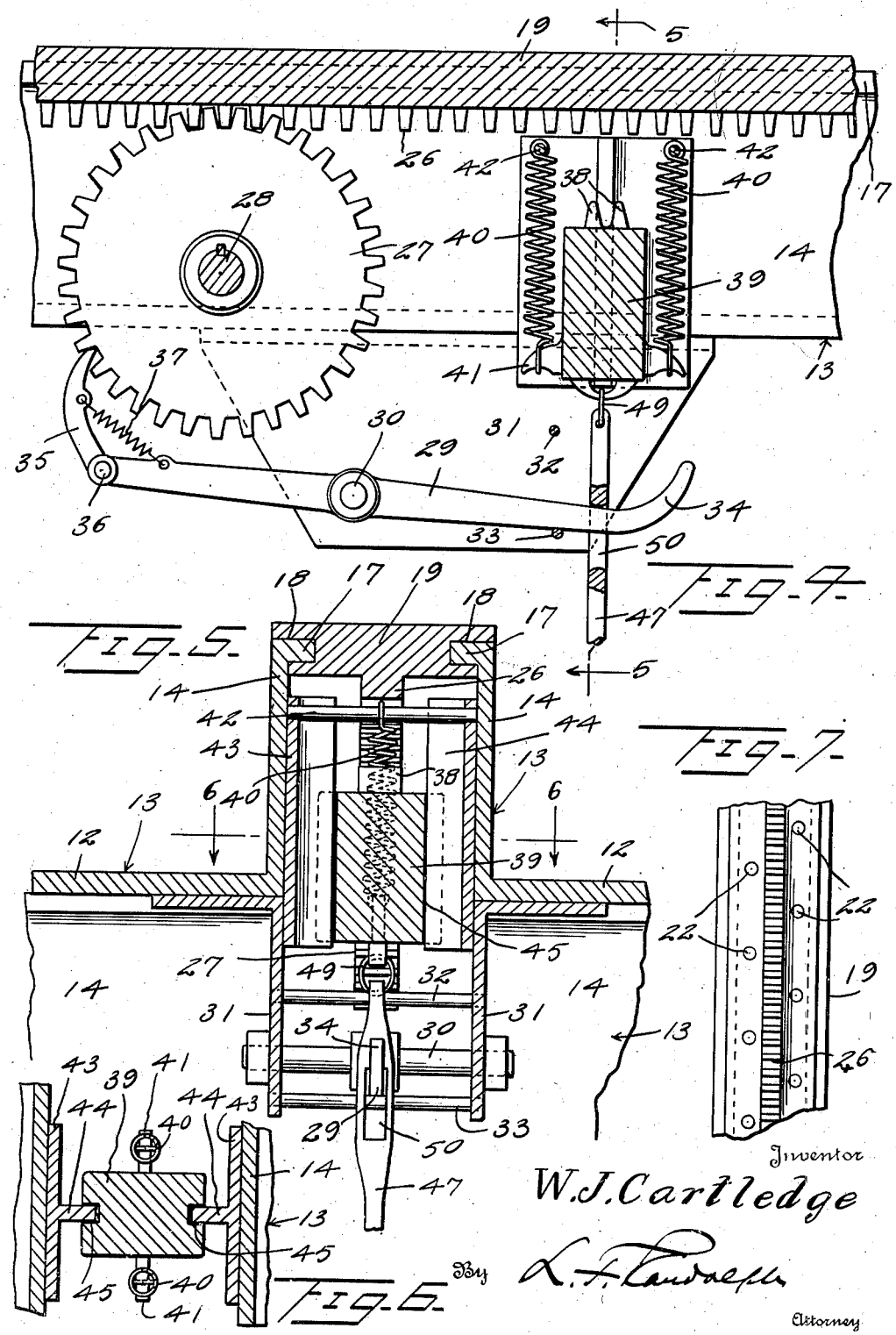

2,366,831

UNITED STATES PATENT OFFICE 2,366,831

WOODWORKING MACHINE

William J. Cartledge, Shively, Ky., assignor of one-third to Louis C. DuPont, Wilmington, Del.

Application April 16, 1942, Serial No. 439,269

4 Claims. (Cl. 144—137)

This invention relates to a machine primarily used for wood-working but capable of operating on many other materials, such as some of the metals, cork, certain plastics and the like.

It is particularly aimed to provide such a machine capable of shaping stock on a concave curve of selectable radius, on a convex curve of selectable radius, or with both such curves.

In addition, I aim to provide the machine of such form that it may also perform straight and bevel cross-cutting, ripping, grooving, banding, routing, shaping, grinding, polishing, and drum and disc sanding by the utilization in a novel manner of a plurality of cutting heads now standard.

Another object is to provide such a machine wherein the curved surface of the work will be greater than and not restricted by the swath of the cutting tool.

Still further I aim to provide novel mountings for the overhead suspension of a saw or other tool and its operation in an arcuate path.

Still another aim is to provide novel means in the machine for the support of the work.

With the above and other objects in view which will be apparent and, in part, be pointed out as the description proceeds, the invention consists in the novel construction, adaptation, combination and arrangement of parts hereinafter described with relation to accompanying drawings and then claimed.

In said drawings, which illustrate one operative embodiment by way of example:

Figure 1 is a right hand end elevation of the machine constituting my invention;

Figure 2 is a front elevation of such machine, the same being partly broken away;

Figure 3 is a partial right hand elevation of the machine on an enlarged scale, as set up for cross-cutting, grooving, ripping and the like;

Figure 4 is a fragmentary longitudinal vertical section to illustrate the mechanism for feeding the stock;

Figure 5 is a vertical section taken on the line 5—5 of Figure 4;

Figure 6 is a horizontal section taken on the line 6—6 of Figure 5;

Figure 7 is an inverted plan view of part of the stock support;

Figure 8 is a detail section taken on the line 8—8 of Figure 3;

Figure 9 is a detail section taken on the line 9—9 of Figure 8; the parts being in position for unlocking of the links connected thereto;

Figure 10 is a view similar to Figure 9 but showing the links in a locked position;

Figure 11 is a view in elevation of one of the main bearing caps, looking toward the inner face thereof;

Figure 12 is a plan view of the locking rings used in connection with the main bearings;

Figure 13 is an elevation of one of said locking rings;

Figure 14 is an elevation of one of the main bearing pins;

Figure 15 is a view primarily in section taken along the line 15—15 of Figure 3;

Figure 16 is a detail partly in section, showing the angular adjustment between the operating motor and one of its supporting arms;

Figure 17 is a section taken on the line 17—17 of Figure 16;

Figure 18 is a fragmentary view in cross-section, showing a concaving operation on work supported by end cleats;

Figure 19 is an elevation of one of the work supporting end cleats;

Figure 20 is a plan view of the end cleat of Figure 19;

Figure 21 is a perspective view of a piece of work turned out by the machine;

Figure 22 is a perspective view showing a piece of work, that of Figure 21, as it may be used in practice; and, Figure 23 is a perspective view of another piece of work which may be operated on by the machine.

Referring specifically to the drawings wherein like reference characters designate like or similar parts throughout the different views, a pair of end supports are provided at 10 to which are bolted, as at 11, the horizontal flanges 12 of spaced apart angle beams or frame members, generally designated 13, and whose vertical walls or flanges are indicated at 14. The described parts are preferably of metal and the end supports 10 are connected and braced by a wooden shelf 15, and bolted as at 16 to the end supports.

The walls or flanges 14 have inwardly extending ribs or tracks 17 which occupy grooves 18 to mount a work support 19 for longitudinal sliding movement. A piece of stock or work is indicated at 20 and it may be held in place on the support 19 by screws 21, as suggested in Figure 1, passing through openings 22 of the work support, the latter being best shown in Figure 7.

Stock or work 20 is particularly adapted to be cut by a rotatable tool such as that disclosed at 23, whose mounting and operation will be later specifically described. The work or stock 20 is fed longitudinally with respect to the machine in successive steps of a width corresponding to the swath of the cutter 23 in order that a convex surface corresponding to the dotted line 24 may be cut when the work or stock is mounted as in Figure 1 and a concave surface corresponding to the line 25 may be cut when the work or stock is mounted as in Figure 18.

To best consider the parts for effecting the aforesaid feeding, reference is to be had to Figures 2 and 4 to 7. Along the under surface and centrally of the work support 19, a row or series of rack teeth 26 depend. Enmeshed with the rack teeth 26 are the teeth of an escapement wheel 27 which is journaled on a short shaft 28 keyed in openings in walls 14 of the beams 13. A control lever 29 is pivoted at 30 on a bolt mounted by depending brackets or angles 31 welded or otherwise fastened to the flanges 12. Lever 29 has a movement limited by upper and lower rods 32 and 33, mounted by the brackets 31 and between which the free end 34 of lever 29 projects. At the other end, lever 29 has a pawl 35 pivoted thereto at 36 which is urged toward the wheel 27 by contractile coil spring 37 fastened at opposite ends to the lever 29 and the pawl 35.

The work support 19 is normally held against movement by teeth 38 of a latch block 39 in mesh with the teeth 26. Latch block 39 is urged to the latching position mentioned by contractile coil springs 40 engaged at one end with lugs 41 projecting from the latch block and at the other end with rods 42 anchored by plates 43, welded or otherwise fastened against the inner surfaces of the walls 14 and which have central vertical guides 44 entered in grooves 45 on opposite sides of the latch block 39 and thus slidably mounting and guiding the latter.

The latch block 39 and lever 29 are under operation of a depressible inclined treadle 46, Figures 1 and 2, to which a vertical link 47 is pivoted at 48 and in turn at its upper end is flexibly connected by a link 49 to the latch block 39. The free end 34 of the lever 29 projects through an opening 50 in the links 47, which opening is elongated or enlarged with respect to the lever. Link 47 passes through an enlarged opening 51 in the shelf 15.

In some instances, the work 24, instead of being secured to the support 19 by the screws 21, is fastened to such support by cleats 52 as detailed in Figures 18, 19 and 20. These cleats have a basal flange 53 provided with openings 54 through which bolts 55 are passed and which also pass through selected openings 22 to mount the cleats on the support 19. Vertical walls 56 rise from the basal walls 53 and they have a multiplicity of openings 57 therethrough through which screws may be passed and entered in the work 24 as in Figure 18 to mount such work. If desired, a filler block of wood or any other material 59 may be interposed between the work and the support 19 as in Figure 18.

Reverting to the cutter 23, it is removably fastened in any suitable manner on a rotatable shaft 24 driven by a gear train encased at 60 and driven by a geared head motor unit 61 adapted to be driven from any suitable source of power, preferably an electric current. Head 61 has aligned mounting arms 62 radiating from opposite sides thereof and which are horizontally disposed. Arms 62 are similar in dimensions and at their outer ends are pivoted on bolts or pins 63 which are mounted in the upper ends of hollow sections 64 of links generally designated 65 and completed by solid or lower sections 66 telescoped in the sections 64 and held in positions adjusted as to length by binding screws 67, threaded in sections 64 and engageable against the sections 66. The bolts or pins 63 occupy openings 68 in sections 64 and such bolts are preferably held against rotation in the openings 68 by screws 69 threaded to the sections 64 and entered in diametric openings 70 in the bolts, as best shown in Figure 15.

The cutter 23 is adjustable in a path concentric with the longitudinal axes of the arms 62, for instance, to position the cutter 23 for beveling. To attain such angular adjustment, the head or unit 61 has end plates 71 and the arms 62 at their inner ends have flanges 72 in contact with plates or heads 71. Stud bolts 73 extend from the heads 71, through arcuate openings 74 in the flanges 72 and beyond the same receive clamping nuts 75. When the nuts 75 are loose, the unit 61 may be adjusted or turned on a horizontal axis and secured at the different adjustments by the nuts 75. In order to provide the requisite strength and take care of the strains and loads involved, an angular flange or ring 76 preferably extends from the inner ends of arms 62 and intimately fits a wall 77 in a depression 78 in the plates 71.

It will be noted that the links 65 are similar. The lower sections 66 at their lower ends, as best shown in Figure 8, are keyed at 79 to main bearing pins 80 which are journaled in similar, approximately centrally located, relatively large upwardly and inwardly extending main bearing members 81, the general shape of which is best shown in Figures 1 and 3. The bearing members are bolted at 81' to the flanges 12 of end supports 10 mounting of the pins 80 in the bearings 81 is best detailed in Figures 8 to 14. The bearings 81 have horizontal portions 82 in which elongated slots 84 are provided. Bearing pins 80, intermediate their ends have abutments 85 thereon extending one-hundred and eighty degrees around the same and the pins also have diametric openings 86 therethrough. Pins 80 extend through the slots 84 and abutments 85 engage one side of the horizontal portions 82. Generally cup-shaped main bearing caps 36' are secured by bolts 87, passing through openings 88 of the caps, to the horizontal portions 82, and said caps partially enclose the abutments 85 and portions of pins 80 outwardly thereof. Generally U-shaped locking rings 89, as shown in Figures 11, 12, and 13, partially surround the pins 80 within the caps 36', and they are notched at 90 for abutment with the faces of the abutments 85 in such manner that rotation of the pins 80 results in equal rotation of the locking rings 89. The bearing caps 36' are equipped with openings or slot 36a with enlargements at 36b, the former to permit free passage therethrough of the pins 80 and the enlargement to permit passage of the abutments 85 therethrough when the parts are disposed as in Figure 9 while retaining the locking rings 89 and limiting their motion to a rotational movement at all times. The pins are free to traverse the slots 84 and 36a only when the slots or openings of the rings are horizontally disposed and open at the left as in Figure 11. When the links are rotated clockwise away from the horizontal as in Figure 10, equal rotation of the locking rings 89 results in the pins 80 becoming progressively encircled to a greater extent thereby locking the pins to a fixed center of rotation.

When the links are in vertical position, as in Figure 3, they may be locked therein by extending screws 91a into the openings 86, such screws being threaded in the horizontal portions 82, as best shown in Figures 8, 9 and 10.

Calibrations are provided at 92 along the link sections 66 and indicator extensions 93 to coact therewith are provided on the adjacent ends of the sections 64. Collars 94 may be slidably positioned on the sections 66 for engagement with the horizontal portions 82 of the bearing arms when the links are in vertical position as in Figure 3, the same to be rigidly fastened in place by binding screws 95 threaded thereto and engageable with the sections 66. These collars serve the function of limiting the decreasing telescoping travel of the links to any predetermined degree when the machine is performing the cutting of concave surfaces in a manner which will be apparent from a study of the drawings. Attention is directed to the fact that the cutting tool 23 may be a standard dado saw assembly, for instance, of six-inch diameter, arranged to cut an adjustable width swath in the stock 24 normally about three-quarters of an inch in width. The structure enables a length of the links to be adjusted and varied at will and locked in any position, thus controlling the radius of the arc through which the motor supporting means, the motor, and finally, the center of the saw must travel. Since the size of the saw or tool 23 utilized for all convex "outside" cutting is the same, the radius of the stock cut is equal to the radius of the arc traversed by the center of the saw minus the radius of the saw, a constant. Thus, the radius of the stock cut is a direct function of the length of the intermediate connecting links 65 permitting the graduations or calibrations 92 to be made in terms of "cut" radii.

It will be clear that the purpose of the stock shifting or feeding mechanism, best shown in Figures 4 to 7, is to feed the stock being machined on the support or bar 19 into the correct position for the cutting swath of the saw or tool 23 and to lock the stock in that position through the agency of the lock block 39 while the swath is being cut. The construction of the shifting mechanism enables the operator to perform these functions by depressing and releasing the foot treadle 46. The shifting gear 27, whose tooth spacing corresponds to the width of the swath cut by the saw, since it is enmeshed with the rack gearing 26, shifts both stock 24 and support or bar 19 according to the angle of its rotation. The tooth or ratchet 35 engages a tooth of the gear 27 and forces the latter to shift the stock when the right end of the lever 29 is depressed through an arc whose length is controlled by the stop bars 32 and 33. On the return cycle of the lever 29, the ratchet 35 "rides" the teeth of gear 27, and upon reaching the end of its motion it is pulled into position for the next thrust by the spring 37. The lever 29 is actuated by the link 47, which, in turn, is pulled down by the treadle 46 and pulled up by the return springs 40.

With the tool or saw 23 mounted and movable as described, it is adapted to cut convex surfaces as at 24 and concave surfaces as at 25. This is shown in Figures 18, 21, 22 and 23. The stock cut as shown in Figure 21 may be used as shown in Figure 22 by subsequently grooving the same at 25c for use with tongue pieces at 25d. Thus the elements of Figure 21 as used in Figure 22, will form a rounded edge for many articles, such as pieces of furniture. The article 25a shown in Figure 23 is of the character adapted to be supported by the cleats 52, as in Figure 18. More specifically to machine a concave curve in a stock which has previously had a convex curve machined in its entire length, it is necessary for the operator to screw the end cleats 56 to the ends of the stock with wood screws. The end cleats then are bolted to the stock support member 19, and the assembly is inserted in the left end of the machine as for machining a convex curve. A dado saw assembly whose diameter is equal to the diameter of the concave cut desired is selected and fastened to the power take-off shaft of the motor. The operator moves the main bearing pins 80 into the rear extremity of the main bearing (Figure 10) and swings the motor upward through its arc of travel until the intermediate connecting links 65 are in a vertical position. This position of the four pivot bearings permits insertion through the bearing, and the four locking pins are locked at 69, thus locking the motor and saw in an upright position over the center of the work. The two stop collars 94 are next adjusted in a position which will arrest the telescoping movement of the intermediate connecting links when the lower edge of the saw unit has reached the desired depth in the work. The operator next releases the two segment lock screws 67, turns on the motor switch, and allows the motor and saw to settle of their own weight slowing downward in a vertical path until the downward motion is arrested by the previously adjusted stop collars 94. At this point the saw and work are as illustrated in Figure 18 and the concave surface has been machined over a length of the work equal to the dado saw assembly thickness. The operator then raises the motor and saw unit, depresses and releases the foot treadle, and again lowers the saw into the work, thus machining another increment of the total work length. This procedure is repeated until the entire work length has been machined to a concave curved surface.

In a case where only a concave surface is desired in the stock, the stock may be fastened directly to the stock support member 19 with wood screws, thus eliminating the need for the end cleats for end support of the work.

For bevel cutting, grinding, ripping, grooving, etc. the machine is set up as illustrated in Figure 3 with the four pivot bearings locked so as rigidly to support the motor and saw unit. Loosening of the four flange joint clamp nuts 75 permits the female halves of the flange joints carrying the motor and saw to rotate clockwise about the axis of the motor support bar assembly 62. Thus any desired angle of the blade up to 45 deg. from the vertical may be achieved. Tightening of the four nuts locks the saw to the selected angle of cut, and work to be ripped or cross-cut may be passed under the blade for cutting. Substitution of the standard saw for any abrasive wheel, sanding disc, dado saw assembly, or any other rotatary cutting means likewise achieves bevel machining.

For performing conventional cross-cutting, ripping, grooving, dadoing, beveling, disc-sanding, drum-sanding, buffing and grinding, the machine is arranged as in Figure 3 with the links 65 fixed in vertical position. A suitable table 96 is used which is bolted in place at 97, detachably, to a series of brackets 98 arranged on opposite sides of the machine and bolted at 99 to the horizontal flanges 12. The design of table 96 may closely approximate that of a conventional bench-saw. It is grooved transversely to accommodate a standard mitre gauge 100 or the equivalent, and serves as a guide for cross-cutting typical stock. The table is also equipped with a rip fence guide bar 101 for receiving a standard rip fence, not shown, to serve as a guide for ripping. It is also equipped with a slotted soft metal table insert at 102 to permit the cutting edge of the tool 23 to extend slightly below the plane of the top of the table. To perform the functions in question, the links 65 are locked in the vertical position by inserting the screws or pins 69 into the openings 70 of the pins 63 rigid with arms 62 and by inserting the screws or pins 91a into the openings 86 of pins 80.

Various changes may be resorted to provided they fall within the scope of the invention as defined by the claims.

I claim as my invention:

1. A machine of the class described having a motor unit, a cutter mounted and rotatable thereby, arms at opposite sides of the unit, link means pivoted to the outer ends of the arms, supports pivotally mounting the link means, and means connecting the unit to the inner ends of the arms for adjustment on the longitudinal axes passing through said arms so that the cutter may be angularly disposed.

2. A machine of the class described having a motor unit, a cutter mounted and rotatable thereby, arms at opposite sides of the unit, link means pivoted to the outer ends of the arms, supports pivotally mounting the link means, and means connecting the unit to the inner ends of the arms for adjustment on the longitudinal axes passing through said arms so that the cutter may be angularly disposed, consisting of contacting plates, certain of the plates having arcuate slots therein and fastening elements passing through the slots and engaging the other plates.

3. A machine of the class described having a unitary operating motor means and oppositely mounted arms for a rotatable cutter, bearing members, link means pivoted to each arm, pins extending from the link means, said bearing members having elongated slots through which the pins pass, bearing caps on the bearing members into which the pins extend, abutment members on the pins within the caps engaging the bearing members, locking rings, said bearing caps having openings for passage of the pins and their abutment members but retention of the locking rings, said rings being cut away to provide for and receive said pin abutments for coaction therewith.

4. A machine of the class described having a unitary operating motor means and oppositely mounted arms for a rotatable cutter, bearing members, link means pivoted to each arm, pins extending from the link means, said bearing members having elongated slots through which the pins pass, bearing caps on the bearing members into which the pins extend, abutment members on the pins within the caps engaging the bearing members, locking rings restrained by said bearing caps, said rings being cut away to provide conditional passage of the pins, said pins having diametric openings therein, and fastenings mounted by the bearing members for passage into said openings to secure the pins and links against horizontal and rotational movement relative to the bearing members.

WILLIAM J. CARTLEDGE.